G. H. CURTISS.
HYDROAEROPLANE.
APPLICATION FILED JULY 25, 1916.

1,203,550.

Patented Oct. 31, 1916.
5 SHEETS—SHEET 5.

Inventor
GLENN H. CURTISS.
by John P. Tarbox
Attorney

UNITED STATES PATENT OFFICE.

GLENN H. CURTISS, OF BUFFALO, NEW YORK, ASSIGNOR TO CURTISS AEROPLANE & MOTOR CORPORATION, A CORPORATION OF NEW YORK.

HYDROAEROPLANE.

1,203,550.  Specification of Letters Patent.  Patented Oct. 31, 1916.

Original application filed August 22, 1911, Serial No. 645,340. Divided and this application filed July 25, 1916. Serial No. 111,243.

*To all whom it may concern:*

Be it known that I, GLENN H. CURTISS, a citizen of the United States, residing at Buffalo, in the county of Erie and State of New York, have invented certain new and useful Improvements in Hydroaeroplanes, of which the following is a specification.

My invention relates to improvements in heavier-than-air flying machines, and has reference particularly to a machine adapted to alight on the water and rise therefrom by its own power.

The invention is directed to the longitudinal balance and control of the machine.

This application is a division of my co-pending application S. No. 645,340 filed August 22, 1911.

My invention will be set forth in the claims.

In the drawings which show the preferred form of my invention, Figs. 13–16 are enlarged details.

It is desirable that provision may be made by which the machine may land and float on the water and be driven forward by its own power in contact with the water, at a speed sufficient to cause the lift of the air to be greater than the weight of the whole machine, in order that the machine may rise out of the water and fly in the air. In the drawings I have shown an aeroplane or heavier-than-air machine provided with floating means to support the same on the water, and other constructions by which this result may be accomplished. The aeroplane proper is substantially the ordinary Curtiss machine which is now well known. It comprises an aeroplane surface sufficient to support the whole machine in the air and which is preferably split up into two superposed areas or surfaces 1 and 2 connected by spacing posts 3 and 4. These aeroplane surfaces define the region of aeroplane lift, and in them as in all cambered or curved aeroplane surfaces the region of the resultant center of lift is located approximately one-third of the chord length from the leading edge.

5 is a front substantially-horizontal rudder pivoted at 6 to the frame and rockable on its pivot by a manually movable device under the control of the operator, such as a lever 7 located in front of the operator's seat and pivoted at 8 to rock back and forth. 9 is a connecting bar pivoted at its ends to the elevating plane 5 and to the lower end of the said post 7.

10 and 11 are fixed horizontal surfaces at the rear, and 12, 13 are substantially horizontal elevating rudders pivoted to the fixed surfaces at 14.

15 is a vertical rudder pivoted to the fixed surface.

16, 17 is the bed for the engine 18. This engine may be the well known eight cylinder 50 horse-power four cycle Curtiss engine, the cylinders being arranged in V position with radiator 19, tail shaft 20, and propeller 21 having a radius of 3½ feet and pitch of 6 feet rotating at about 1200 revolutions per minute.

Figures 5, 6:
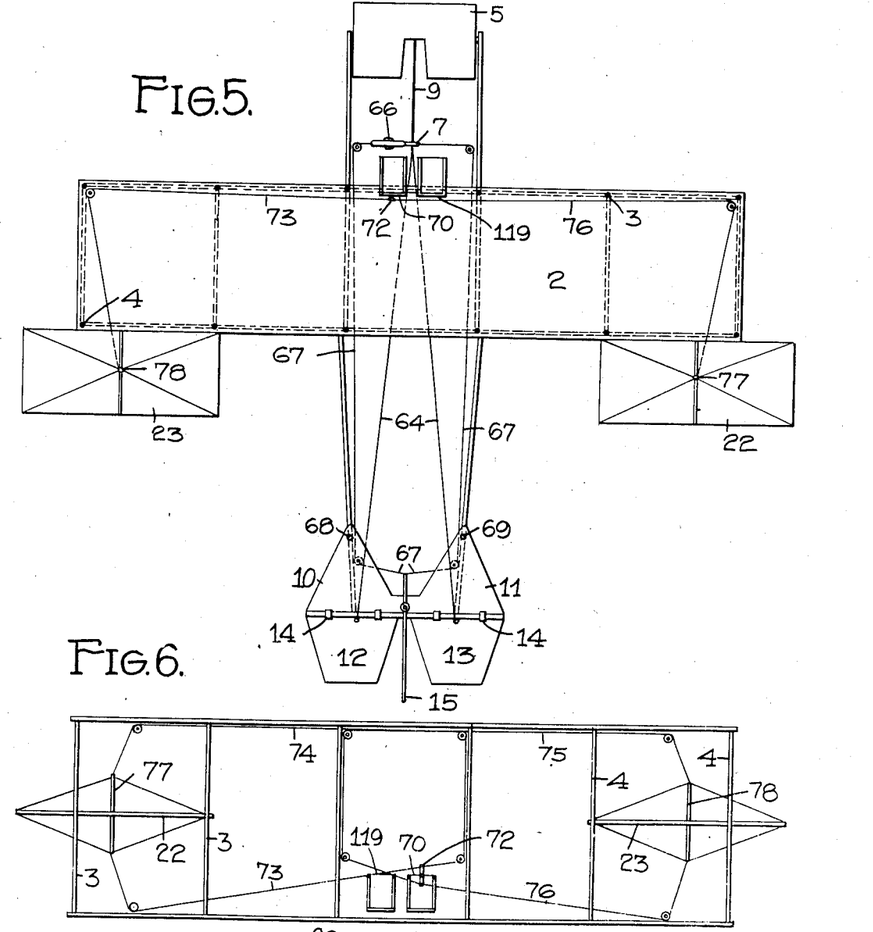
Fig. 5 is a top plan view of the machine.
Fig. 6 a front view showing the arrangement of the mechanism for operating the ailerons.

22 and 23 are substantially flat ailerons located between the surfaces 1 and 2 and are preferably pivoted to the rear posts 4, 4. These ailerons may be thrown in opposite directions by the operator by means which will be hereafter described and which are shown in Fig. 6, in order to restore the equilibrium of the machine in flight through the air.

The elevating rudders 5, 12 and 13 serve to direct the course of the machine up or down as desired, and the means by which they may be operated will be more particularly described hereafter.

Carried below the aeroplane surface 2 and fixed thereto by braces 24, 25, 26 is a floating means or base adapted to support the machine on the water. In the preferred form of my invention shown in the drawings this consists of a single watertight boat 27, one foot deep, two feet wide, and 16 feet long, flat on top and bottom and upwardly-inclined at its forward under-surface 28 to form a transversely broad landing prow and downwardly inclined at its rear upper surface 29 to form in intersection with the bottom a transverse terminal edge extending all the way across the boat. The surface 28 and the flat bottom are hydroplaning surfaces and both of them terminate laterally in abruptly turned chine edges. When the machine is at rest on the water the boat or base is submerged to substantially the water line indicated by the dotted line 30, and preferably extends somewhat forward of the aeroplane proper and to the rear of the propeller 21 and also to the rear of the center of gravity of the machine.

It will be observed that the front or nose of the base is projected a greater distance in front of the aeroplane wings than is the rear terminus to the rear thereof. Thus obviously the major portion of the under hydro-surface lies in advance of the region of aeroplane lift. It will also be obvious that when the machine is at speed on the water the action of the surface of the inclined prow and flat bottom lifts the boat to the top of the water. Furthermore that in accordance with the laws of the hydroplane the region of the center of hydroplane lift lies nearer to the front edge of the surface than to the rear edge, in the usual case one-third its length from the leading edge. The projection of the boat forward of the wings as shown places its central portion opposite the region of the center of aeroplane lift, and therefore its own center of lift in advance thereof.

I prefer to divide the floating means into separate compartments by transverse partitions 31 to prevent any water which may leak in from flowing back and forth in the boat.

Figure 1:
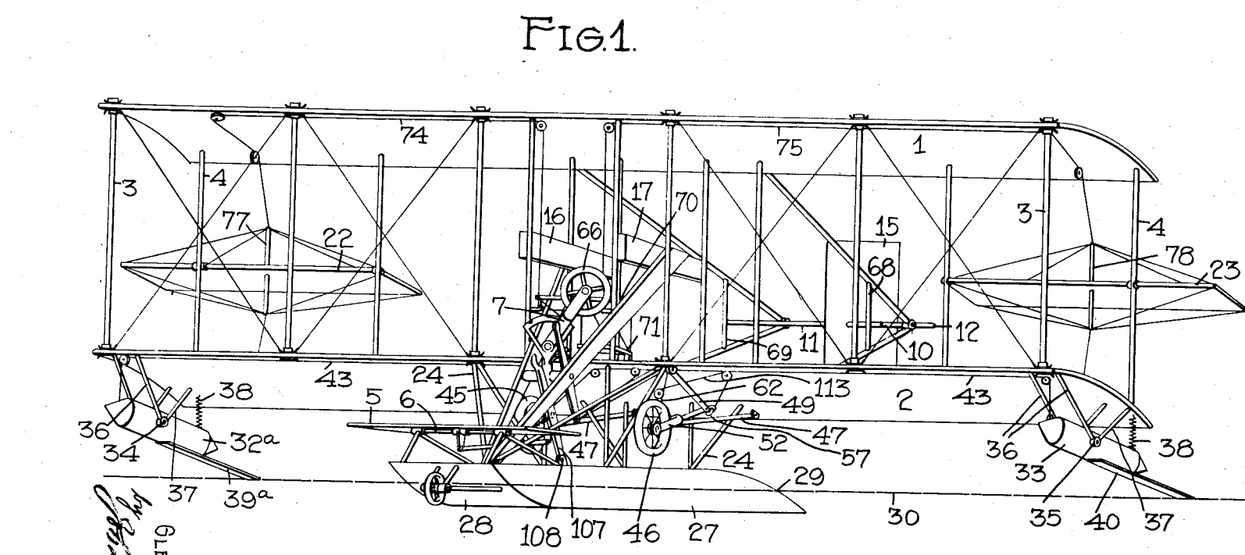
Figure 1 is a perspective view from the front, parts having been omitted in order not to complicate the drawings.
Figures 2, 3, 4:
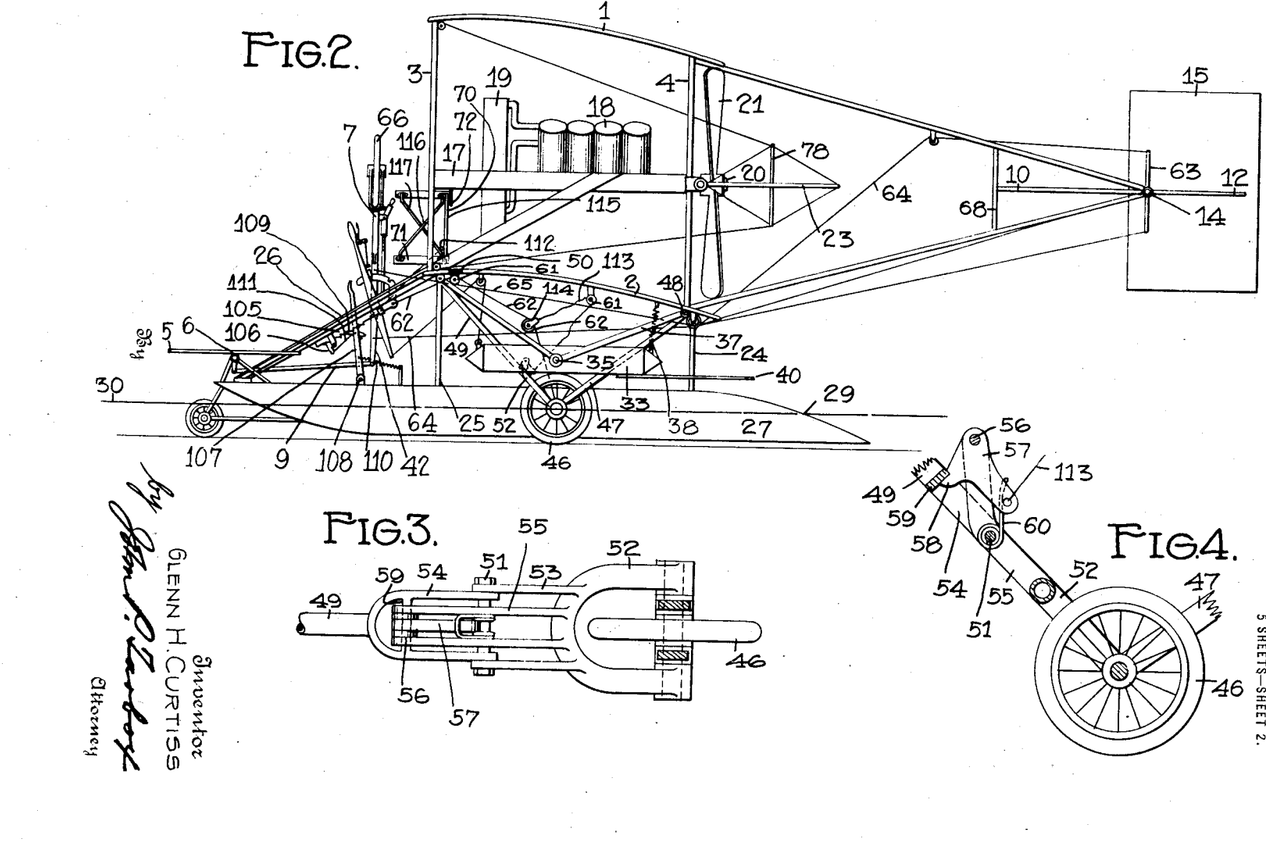
Fig. 2 is a side elevation.
Figs. 3, 4 and 14 are details of the folding wheel construction.

In order to prevent either side of the planes from coming in contact with the water during travel through the water, I have provided at each side thereof devices acted on by the rush of water at positive angles of incidence in order to give a lift to either side which may be depressed. These are preferably upwardly inclined devices extending slightly into the water when the machine is at rest, and which when the machine is at full speed barely touch the water, and in the embodiment shown are narrow blades 39 and 40 of flexible wood which, in traveling over the water, stand in the position shown in Fig. 1. If either side of the machine tips downward, the blade on that side touches the water and through the lift exerted by the rush of water straightens up the machine to substantial equilibrium. This operation in the embodiment shown takes place without any necessary action on the part of the operator, and therefore constitutes an automatic stabilizing means. The floats 32 and 33 are preferably pivoted at 34 and 35 to the braces 36, 37, and 38, 38′ are springs normally tending to hold the floats horizontal as shown in Fig. 1. In order that the operator may, if he desires vary the inclination of the floats and blades I have provided a lever 42 connected to a wire 43 leading to each float, so that by movement of said lever from the position shown in Fig. 2 to that shown in Fig. 1, the floats, and with them the blades, may be inclined upward. Movement of the leve in the reverse direction allows the floats and blades to return to the horizontal position shown in Fig. 2 where they will exert sligh head resistance to the rush of air. Whe the machine is at rest on the water, th floats may be allowed to take the horizonta position and prevent either side of the ma chine from dipping into the water. Whe the machine is started, the operator ma throw his lever to incline the floats an blades, as shown in Fig. 1, and they wi then act as an automatic stabilizing mean When the machine gets into the air the o erator causes them to return to the ho zontal position.

The inclined portion 28 of the boat is o form of a hydro-surface which is adapt to first strike the water as the machine d scends and serves to tilt the front of t machine upwardly as it alights on t water, in order that the sudden resistanc offered by the water may not cause the n chine to dive.

Figure 14:
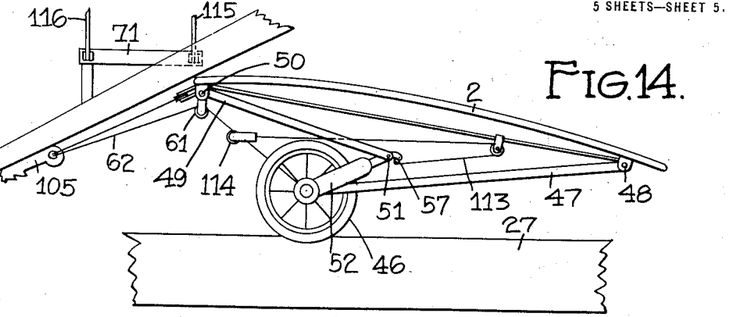

45 and 46 are wheels constituting the p ferred form of means for supporting t machine in travel in contact with the ear if the machine is desired to run over t earth also. They are hung from the n chine and project slightly below the lov surface of the boat, as indicated in Fig. In order that they may exert less resista when the machine is moving through water, I have provided means under the c trol of the operator for raising the whe out of the water when the machine is fl ing, and for depressing the same at v In the preferred construction, 47 is a br pivoted at 48 to the frame of the mach and 49 is another brace pivoted at 50 to frame, and at 51 pivoted to a short arm A locking device shown in Figs. 3 and detail operates to hold the wheels in t depressed position shown in Fig. 1. shown in Figs. 3 and 4 and 14 the whe pivoted to the U-shaped frame 52 ha projections 53 pivoted to the U-shaped 54 of the brace 49. Bent arms 55 fixe the frame 52 carry pivoted to them at locking detent 57, which has a catch-no engaging a bar 59 on the U-shaped fram 60 is a spring normally holding the l in the position shown in Fig. 4.

Figure 13:
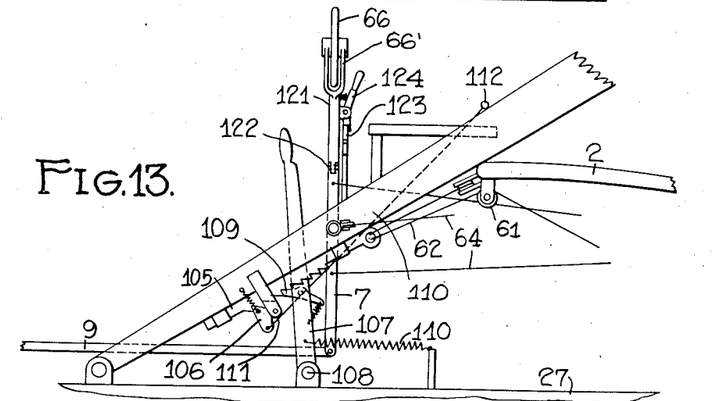

The preferred mechanism for raising wheels comprises a slidable rack bar 105 (see Figs. 13 and 14) engaged by a spring-pressed detent 106. 62 is a wire connected to the bar and running to the axle of the wheel, being led over suitable pulleys such as 61. 107 is a foot lever pivoted to the boat at 108 and carrying a spring dog 109, 110 is a spring to draw lever 107 backward. As the foot lever is reciprocated it forces the bar 105 downwardly, being held by detent 106 at each reciprocation, drawing on wire 62 and collapsing the frame 47, 49, 52 to the raised position shown in Fig. 14. The holding latch 106 may be tripped by a wire 111 and handle 112 adjacent to the operator's seat. In order to release lock 57 a wire 113 runs therefore to a pulley 114 loose on wire 62. This latter is slack when the wheels are down and locked, and as the slack is taken up it draws on wire 113, unlocking latch 57 just before wire 62 becomes taut. Of course the other wheel is provided with the same construction, the wires 62 of both wheels being connected to rack bar 105. Releasing the detent 106 before the machine comes out of the water allows the weight of the parts and the resistance offered by the water to throw the wheels back to the locked position shown in Figs. 1 and 4. The machine may then travel out of the water onto the land and over the same without the resistance which would be exerted by the boat 27 if in contact with the earth.

Figures 15, 16:
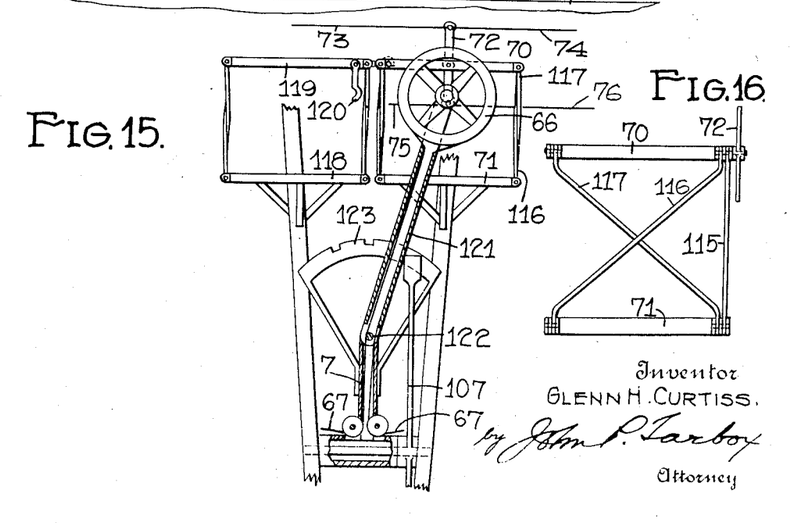

The elevating rudders 5, 12 and 13 are pivoted on transverse axes 6 and 14. Each of the rear rudders carries a post 63 extending above and below it, and from the upper end of each post a wire 64 leads to the lever 7 below its pivot, and from the lower end of each post 63 a wire 65 leads to the lever 7 above its pivot. Consequently when the lever 7 is pulled backward toward the operator, the connecting bar 9 causes the elevating rudder 5 to be presented to the wind at a positive angle of incidence and both rudders 12 and 13 to be tilted up to a negative angle of incidence. Consequently the action of the air on the rudder 5 tends to elevate the front of the machine, and the action of the air on the rudder 12 and 13 tends to depress the rear of the machine. Obviously movement of lever 7 in the opposite direction has the contrary effect. The rudders 12 and 13 are preferably cut away as shown in Fig. 5, and pivoted between them and to the horizontal fixed surface is a vertical rudder 15 which swings between the rudders 12 and 13. The vertical rudder may be operated from a steering wheel 66 mounted on lever 7 and connected to the vertical rudder by tiller ropes 67, passing up through the hollow lever 7, arm 121 and around said wheel 66 as shown in Fig. 15.

The fixed surfaces 10 and 11 are substantially V-shaped but joined together to provide a fixed pivot for the vertical rudder and are fixed at their rear and immovably held at their apexes by the connecting struts 68 and 69. This construction prevents the "whipping" which might occur if the V-shaped space between them were not provided.

The ailerons 22, 23 are preferably located substantially midway between the surfaces 1 and 2, and therefore are not so much affected by the deflection of the air currents caused by the impingement of the air on said surfaces 1 and 2, as said ailerons would be if they were hung directly to the rear edge of said surface. In the present embodiment I have shown them as pivoted to the rear posts, but this location is not essential, although such location is preferable as the wedging effect of the air is less at this position than would be the case if they were moved forward and pivoted to the front posts. I, however, do not desire to be limited to either such location of the ailerons. In order to provide means under the control of the operator for throwing these ailerons to opposite angles of incidence, I have provided connections therefrom by which the operator may tilt them in either direction, and preferably simultaneously in opposite directions. This in the embodiment shown comprises a laterally movable device, such as a shoulder frame 70, pivoted to the seat 71 by connecting bars 115, 116, 117 by which the frame may be moved from side to side, and carrying pivoted to it a rocking arm 72 with wires or ropes 73, 74 and 75, 76, said wires being attached to the projections or posts 77, 78 on the ailerons. It will be obvious that moving the shoulder frame in either lateral direction will tilt the ailerons in opposite directions. The ailerons, as well as the rear rudders 12 and 13, are stiffened by wire running from each end of the posts or projections thereon to the corners of said surfaces.

In order to allow the control mechanism which operates the ailerons and vertical and horizontal rudders to be shifted to or from a passenger I have provided a construction by which this may be done instantaneously when in flight. In the preferred construction illustrated the passenger is provided with a seat 118 and laterally movable shoulder frame 119 similar to that on seat 71, but normally unconnected to frame 70. In order to connect the frame 119 to the aileron wires so that they may be operated from frame 119 I have provided a latch 120 which may be snapped over frame 70 as shown in dotted lines. This may be done almost instantaneously, and the passenger may then operate the ailerons. In order to pass the control for the vertical and horizontal rudder to the passenger I prefer to rotatably mount the steering wheel 66 within a fork 66 on arm 121 pivoted to lever 7 at 122 so that the wheel may be passed across from one seat to the other. It may be locked in either position by a quadrant 123 fixed to lever 7 and a spring latch 124 on arm 121. This construction has been used with perfect success in transferring control of the machine from one operator to another during free flight in the air. Obviously the mode of operation of the machine is precisely the same from either seat.

Figure 10:
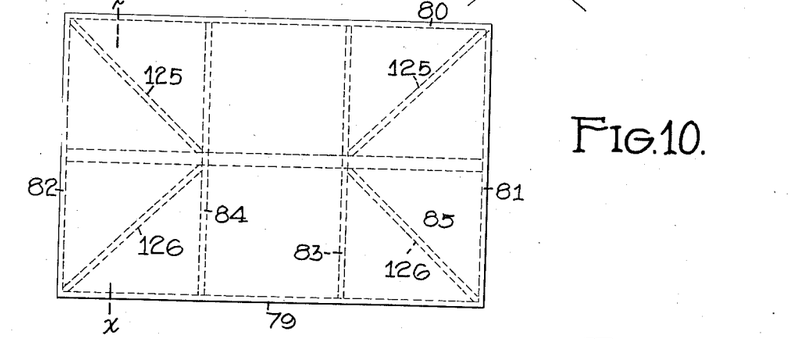
Fig. 10 a plan view of one of the panels.

In order to provide a construction of the surfaces 1 and 2 which will allow the same to be inexpensively constructed and easily set up and taken down, I prefer to build said surfaces of similar panels, with sockets by which a panel may be easily fastened to or detached from an adjacent panel, and the sockets provided with means for attaching the spacing posts to them in order that any number of surfaces may be easily superposed, and in fact any form of machine made without materially weakening the construction. The machine shown is built up of separate panels, one of which is shown in Fig. 10, comprising a frame having a front bar 79, a rear bar 80, side bars 81 and 82 and ribs 83, 84. Cloth or any other equivalent air-resisting material 85 is stretched over top and bottom of the frame and may be tacked to the bars and ribs.

125, 126 are strengthening braces to prevent lateral distortion.

Figure 7:
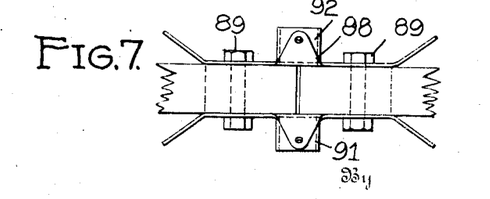
Figs. 7 and 8 are rear and side elevations of a socket.
Figure 8:
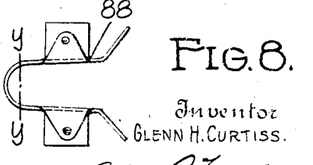
Figure 9:
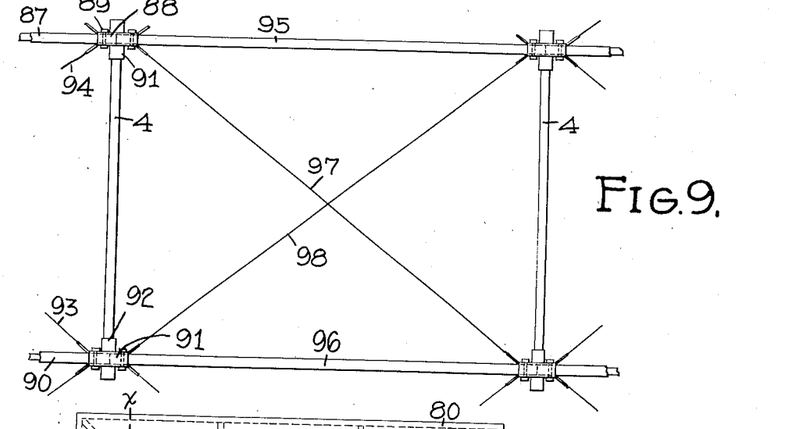
Fig. 9 is a front elevation of a portion of the superposed surfaces.
Figure 11:
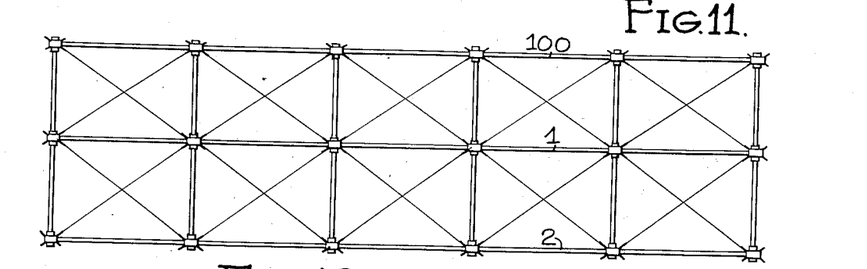
Fig. 11 a front elevation of a machine having three superposed surfaces.
Figure 12:
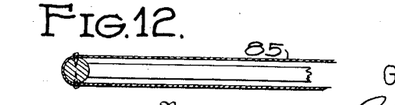
Fig. 12 is a sectional detail of Fig. 10 taken on the line X—X.

In order to detachably hold the panels, I have provided sockets such as shown in Figs. 7, 8 and 9, made of metal bent into a substantial U-shape. As seen in Fig. 9, the panel 87 is slipped laterally into the socket 88 and fastened by passing the bolt 89 through the socket and side bar. The panel 90 is slipped into the similar socket 91 and similarly fastened. The spacing post 4 is slipped into the sockets 91 and 92, and the diagonal trussing wires 93, 94 attached to the diagonal ears of the socket. If two additional panels are to be provided in the same plane as the other panels, the similar panels 95, 96 may be slipped into the open ends of the sockets and similarly fastened and trussed by the wires 97, 98. The sockets 125 at the rear may be the same, or, if it is desired to extend the surfaces beyond the rear posts, they may be made in two parts by merely cutting off the connecting metal as shown by the dotted lines y—y in Fig. 8. If it is desired to make a machine of three superposed surfaces, or to add or omit any desired panels, it is very easy to do so. For example as shown in Fig. 11, an additional surface 100 has been added above the other two by adding five similar panels with sockets and posts and trussing wires. With such construction the machine may be easily assembled and knocked down, and the cost of construction is materially reduced.

Assuming the machine to be resting on the water, the operator releases his lever allowing the floats 32 and 33 to come to the horizontal position so that they support either side of the machine which tips downwardly. After raising the wheels, the engine is started, which will drive the machine through the water, and as it starts the operator pulls on the lever, inclining the balancing blades to the position shown in Fig. 1 and, as the boat lifts somewhat as the speed increases, they barely touch the water as long as the machine is in balance laterally. The rush of the water against them exerts a lift, and depression of one side of the machine causes the blade on that side to enter the water to an extent proportional to the amount of depression and the other blade will rise out of the water. The one in the water exerts a lift due to water-rush against the inclined surface which will restore equilibrium, and the lift decreases as equilibrium is approached. The machine will therefore automatically be kept substantially horizontal. In making a turn to the left or the right on the water, the effect of the rear vertical steering rudder may b supplemented by causing the one or th other balancing blade to exert a drag o the side toward which the turn is to k made. This may be done by depressin either side of the machine by the use of tl ailerons. This will cause the machine to t laterally and the blade on the depressed si to dip into the water to an abnormal exter and help to turn the machine toward th side. The action of the inclined prow sv face 28 of the boat causes the machine tilt upward somewhat, and the flat hydr planing under-surface of the boat and t downwardly-inclined surface 29 and t edge in which it terminates thereon cau: the water to be left in a not seriously d turbed condition and through the hyd planing action prevents the machine fr burying, that is, tipping unduly downw: at the rear. When the speed of the mach over the water is sufficient, the opera pulls the lever 7 backward, which tilts front elevating rudder to a positive angle incidence, and the two rear elevating r ders to negative angles of incidence, and machine is thereby rocked backward with the resulting increase in angle of i dence of the wings rises out of the w: The operator then releases the lever which allows the floats 32, 33 and blade take the horizontal position where they ( the least resistance to the atmosphere. descending to alight on the water, the o ator shuts off his engine if desired, glides downward to the water, at the : time pulling on his lever 42 to incline balancing blades. The inclined hydro face 28 strikes the water and serves to the machine upwardly from its gliding course, so that it will not topple over forward and tend to dive. As it runs forward on the water, the blades keep it in substantial equilibrium. If it is desired to run out onto a beach, for example, the engine may be started or allowed to continue to run, and as the shore is approached the operator releases detent 106 which allows the wheels to drop back to their position shown in Fig. 2 and as they project slightly below the bottom of the boat he may run up on the land. The machine may either rise from the land or water as desired.

I am aware that various modifications may be made in my invention without departing from the spirit of the claims, and I therefore do not desire to be limited to the preferred embodiments herein shown in the drawings.

What is claimed is:

1. A hydroaeroplane comprising aeroplane wings, a longitudinally continuous water-borne base therefor having a hydroplaning surface therebeneath arranged to exert its hydroplane lift substantially vertically below the region of the center of aeroplane lift and terminating rearwardly in a transverse edge extending across said base and constituting substantially the lowermost portion of said surface, said base projecting a considerable distance in front of the region of aeroplane lift such that the said edge is nearer said region than is the front of said base, elevating controls located longitudinally distant from and above said edge, means to steer said machine in air, and aerial driving means exerting its thrust substantially horizontally and materially above said base.

2. A hydroaeroplane comprising aeroplane wings, a longitudinally continuous water-borne base therefor having a hydroplane bottom making a small positive angle with said wings and terminating rearwardly in a transverse edge constituting substantially the lowermost position of said surface and terminating laterally in abruptly turned chine edges, said base projecting a considerable distance in front of the region of the center of aeroplane lift such that the said edge is nearer the region of aeroplane lift than is the front of said base, elevating controls located longitudinally distant from and above said edge, and aerial driving means exerting its thrust on a horizontal line materially above said base.

3. A hydroaeroplane comprising aeroplane wings, a longitudinally continuous water-borne base therefor having a hydroplaning bottom terminating rearwardly in a transverse edge located in the rear of the center of gravity of the machine as a whole and terminating laterally in abruptly turned chine edges, said base projecting a considerable distance in front of the region of the center of aeroplane lift such that the said edge is nearer to the region of aeroplane lift than is the front of the base, and said base having a transversely broad downwardly and rearwardly extending landing prow, elevating controls located longitudinally distant from and above said edge, and aerial driving means exerting thrust on a substantially horizontal line above said base.

4. A hydroaeroplane comprising aeroplane wings, aerial driving means, a longitudinally continuous waterborne base therefor having a hydroplaning surface therebeneath and terminating in an edge, elevating and steering controls located longitudinally distant from and above said edge and forming with said hydrosurface and edge, an angle of substantial saliency of which the edge constitutes the apex, said base being of sufficient length to give substantial longitudinal stability both when standing and when operating at speed upon the water, yet freely rockable through manipulation of said elevating controls, and said wings making a small positive angle with said hydrosurface whereby the wings are maintained at a flying angle of incidence while the craft is operating at speed on the surface of the water and said flying angle of incidence may be varied.

5. A hydroaeroplane comprising aeroplane wings, an aerial driving means, a longitudinally continuous waterborne base therefor having a hydroplaning surface therebeneath terminating in a transverse edge and the major portion of the area of which lies in advance of the region of aeroplane lift, elevating and steering controls located aft of, distant from and above said edge and forming with said hydroplaning surface and edge, an angle of substantial saliency, said base being of sufficient length to give substantial longitudinal stability both when standing and when operating at speed upon the water, yet freely rockable through manipulation of said elevating controls, said base being free of material water resistant surfaces aft of the terminus of said hydroplaning area and said wings making a small positive angle with said hydroplaning surface whereby the wings are maintained at a flying angle of incidence while the craft is operating at speed over the surface of the water and said flying angle of incidence may be freely varied.

6. A hydroaeroplane comprising aeroplane wings, a longitudinally continuous waterborne base therefor having a hydroplaning area therebeneath terminating in an edge and the major portion of which lies in advance of the region of aeroplane lift, an aerial driving means therefor exerting a driving thrust on a horizontal line above said hydroplaning surface, elevating and steering controls located longitudinally distant from and above said edge and forming with said hydrosurface and edge, an angle of substantial saliency of which the edge constitutes the apex, said base being of sufficient length to give substantial longitudinal stability both when standing and when operating at speed upon the water, yet freely rockable through manipulation of said elevating controls, and said wings making a small positive angle with said hydrosurface whereby the wings are maintained at a flying angle of incidence while the craft is operating at speed on the surface of the water and said flying angle of incidence may be varied.

7. A hydroaeroplane comprising aeroplane wings, aerial driving means, a longitudinally continuous waterborne base therefor having a hydroplaning surface therebeneath terminating in an edge, said hydroplaning surface having a broad downwardly and rearwardly inclined area at the frontal portion thereof in advance of said wings, a substantially horizontally extending area beneath the resultant center of lift of said wings, and a transversely extending edge rearward of said latter area, elevating and steering controls located longitudinally distant from and above said edge and forming with said hydrosurface and edge, an angle of substantial saliency of which the edge constitutes the apex, said base being of sufficient length to give substantial longitudinal stability both when standing and when operating at speed upon the water, yet freely rockable through manipulation of said elevating controls, and said wings making a small positive angle with said hydrosurface whereby the wings are maintained at a flying angle of incidence while the craft is operating at speed on the surface of the water and said flying angle of incidence may be varied.

8. A hydroaeroplane comprising aeroplane wings, aerial driving means, a longitudinally continuous waterborne base therefor having a hydroplaning surface therebeneath terminating in an edge, the center of hydroplaning lift of which surface when the craft is operated at speed upon the water lies in the vicinity of the vertical projection of the region of the resultant center of lift of said aeroplane wings, elevating and steering controls located longitudinally distant from and above said edge and forming with said hydrosurface and edge, an angle of substantial saliency of which the edge constitutes the apex, said base being of sufficient length to give substantial longitudinal stability both when standing and when operating at speed upon the water, yet freely rockable through manipulation of said elevating controls, and said wings making a small positive angle with said hydrosurface whereby the wings are maintained at a flying angle of incidence while the craft is operating at speed on the surface of the water and said flying angle of incidence may be varied.

9. A hydroaeroplane comprising aeroplane wings, aerial driving means, a longitudinally continuous waterborne base therefor having a hydroplaning surface therebeneath terminating in an edge, the center of hydroplaning lift of which surface when the craft is operated at speed upon the water lies in the vicinity of the vertical projection of the resultant center of lift of said aeroplane wings but slightly in advance of the same, elevating and steering controls located longitudinally distant from and above said edge and forming with said hydrosurface and edge, an angle of substantial saliency of which the edge constitutes the apex, said base being of sufficient length to give substantial longitudinal stability both when standing and when operating at speed upon the water, yet freely rockable through manipulation of said elevating controls, and said wing making a small positive angle with said hydrosurface whereby the wings are maintained at a flying angle of incidence while the craft is operating at speed on the surface of the water and said flying angle of incidence may be varied.

10. A hydroaeroplane comprising aeroplane wings, a longitudinally continuous waterborne base therefor having a hydroplaning surface therebeneath projecting considerably in advance of said wings and having a downwardly and rearwardly inclined broad frontal portion, and a broad laterally extended portion extending more horizontally and rearwardly terminating in an edge located aft of said wings, the center of hydroplaning lift of which surface when the craft is operated at speed upon the water lying in the vicinity of the vertical projection of the region of the resultant center of lift of said aeroplane wings, but somewhat in advance of the same, aerial driving means having a line of driving thrust located materially above said waterborne base, elevating and steering controls located aft of, distant from and above said edge and forming with said hydroplaning surface and edge, an angle of a substantial saliency of which the edge constitutes the apex, said base and hydroplaning surface being of sufficient length to give substantial longitudinal stability both when standing and when operating at speed upon the water, yet free of material water resistant surfaces aft of said terminal edge of the hydroplaning surface and freely rockable through manipulation of said elevating controls, and said wings making a small positive angle with said hydroplaning surface whereby the wings are maintained at a flying angle of incidence while the craft is operating at speed over the surface of the water and said flying angle of incidence may be freely varied.

11. A hydroaeroplane comprising aeroplane wings, aerial driving means, a longitudinally continuous waterborne base therefor having a hydroplaning surface therebeneath terminating rearwardly in an edge constituting substantially the lowermost portion of said surface and said base having a transversely broad downwardly and rearwardly inclined landing prow, and elevating and steering controls located longitudinally distant from and above said edge and forming with said hydrosurface and edge an angle of substantial saliency of which the edge constitutes the apex, said base being of sufficient length to give substantial longitudinal stability both when standing and when operating at speed upon the water, yet freely rockable through manipulation of said elevating controls, whereby the angle of incidence of said wings may be varied.

12. A hydroaeroplane comprising aeroplane wings, aerial driving means, a longitudinally continuous waterborne base therefor having a hydroplaning surface therebeneath terminating rearwardly in an edge constituting substantially the lowermost portion of said surface the center of hydroplaning lift of which surface when the craft is operated at speed upon the water lies in the vicinity of the vertical projection of the resultant center of lift of said aeroplane wings but in advance of the same, elevating and steering controls located longitudinally distant from and above said edge and forming with said hydrosurface and edge an angle of substantial saliency of which the edge constitutes the apex, said base having a transversely broad downwardly and rearwardly inclined landing prow and being of sufficient length to give substantial longitudinal stability both when standing and when operating at speed upon the water, yet freely rockable through manipulation of said elevating controls when the machine is at speed, whereby the angle of incidence of wings may be varied.

In testimony whereof I affix my signature.

GLENN H. CURTISS.